E. TYDEN.
SEAL LOCKING DEVICE.
APPLICATION FILED FEB. 26, 1915.
1,155,772.  
Patented Oct. 5, 1915.
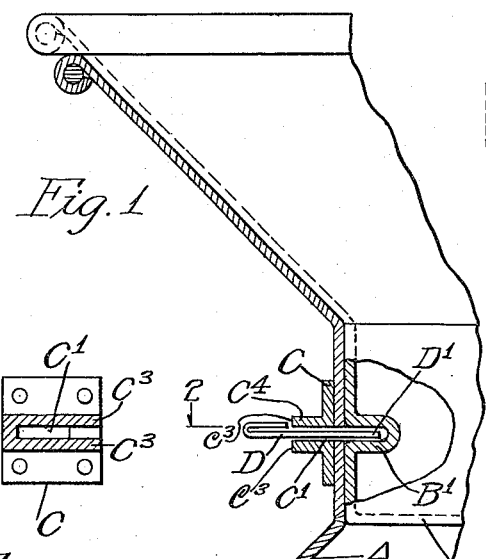
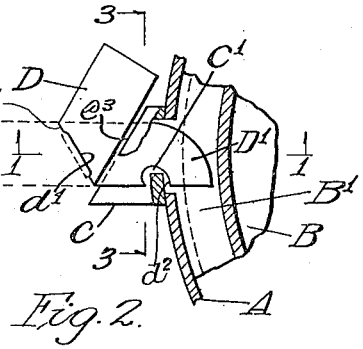
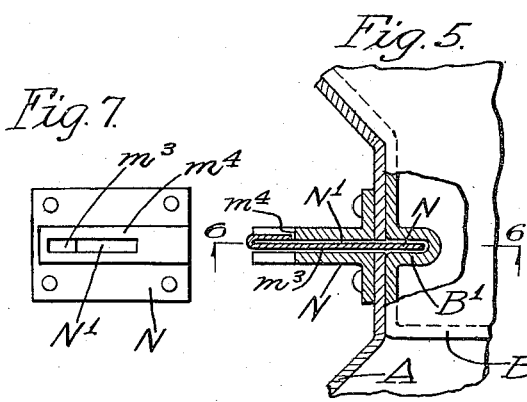
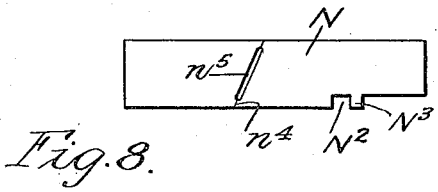
Witnesses:  
Inventor:  
Emil Tyden  
by Burton & Burton  
his Attys.

UNITED STATES PATENT OFFICE.

EMIL TYDEN, OF EVANSTON, ILLINOIS.

SEAL-LOCKING DEVICE.

1,155,772.  Specification of Letters Patent.  Patented Oct. 5, 1915.

Application filed February 26, 1915. Serial No. 10,817.

*To all whom it may concern:*

Be it known that I, EMIL TYDEN, a citizen of the United States, and resident of Evanston, in the county of Cook and State of Illinois, have invented new and useful Improvements in Seal-Locking Devices, of which the following is a specification, reference being had to the accompanying drawings, forming a part thereof.

The purpose of this invention is to provide an improved device of the nature of a seal lock particularly adapted for such articles as cans, boxes, and the like, in which two members which are telescoped together or interlapped or overlapped, are connected in the locking.

It consists in the elements and features of construction shown and described as indicated in the claims.

In the drawings: Figure 1 is a radial section elevation of a portion of a can (a common form of milk can being intended), equipped with the device of this invention. Fig. 2 is a section at the line 2—2 on Fig. 1. Fig. 3 is a section at the line 3—3 on Fig. 2. Fig. 4 is a plan view of the seal bolt. Fig. 5 is a view similar to Fig. 1 showing a modified form of the device. Fig. 6 is a section at the line 6—6 on Fig. 5. Fig. 7 is a front elevation of the mount. Fig. 8 is a plan view of the seal bolt of the form shown in Figs. 5, 6 and 7.

In the structure shown in the drawings, A represents the body of a can and B the interior telescoping cover. These two elements may stand for the coöperating elements of any device having interlapped or overlapped or telescoped parts which are connected together by the seal-locking device and entirely without regard to which is the body and which is the cover.

C is the mount for the seal bolt, D. This mount is a metal fitting designed to be riveted to the outer of the two members which are to be secured together by the device. It has an aperture, $C^1$, through which the engaging terminal or projection, $D^1$, of the seal bolt, D, is inserted for locking, said terminal or projection, $D^1$, being adapted to be hooked into engagement with the margin of the aperture in inserting the seal bolt into locking position. In this locking position the locking is effected by the inserted projection or terminal of the seal bolt becoming engaged above the shoulder, $B^1$, of the cover to prevent its withdrawal from the body, A, and this locking operation of the bolt is to be distinguished from its own hooked engagement with the margin of the aperture of the mount through which it is inserted, the latter being merely the means by which the withdrawal of the bolt from its locking position is prevented. The mount, C, has exteriorly-projecting guards, $C^3$ and $C^4$, which form a path-way through which the flat seal bolt, D, is inserted with an edgewise turning movement to intrude its terminal or projection, $D^1$, through the aperture $C^1$, and engage the hook shoulder, $d^2$, with the margin of the aperture through which it is inserted. The outer end of one of the flanges or guards, $C^3$, terminates in an oblique edge, $c^3$, and the seal bolt, D, is weakened for folding at an obliquely transverse line, $d$, whose angle to the lateral edge of the seal bolt is such as to cause the outer portion when folded at said weakened line to extend along the oblique edge, $c^3$, of the guard or flange, $C^3$ of the mount. The weakening of the seal bolt, as indicated, may be effected by cutting a transverse slot, $d^1$.

When the seal bolt has been inserted and engaged by the edgewise turning movement necessary to effect such engagement, it is folded at the weakened line indicated and thereby engaged by the oblique edge $c^3$, of the mount which prevents the seal bolt from being turned so as to unhook it and disengage and withdraw it without first straightening out the seal to its original form which will cause it to break at the weakened line disclosing the tampering with the device.

In the form shown in Figs. 5, 6, 7 and 8, the seal bolt, N, is designed to engage the shoulder, $B^1$, of the cover by the extreme end of the seal bolt thrust through the aperture, $N^1$, of the mount, N, and instead of the hooked end of the bolt shown in the other figures engaging the margin of the aperture of the mount, a hooking action is effected by either one or both of the means shown consisting of a notch, $N^2$, in one lateral edge of the seal bolt which engages a projection, $M^2$, of the mount and a projecting tooth, $N^3$, of the bolt engaging a recess or aperture, $M^3$, of the mount, both of said engagements being effected by an edgewise swinging movement of the seal bolt, M, after it has been thrust in endwise for engagement of its terminal with the shoulder, $B^1$. In this form the mount is constructed with a throat-way, $m^3$, through which the seal bolt is inserted endwise and which is wide enough to permit it to be turned edgewise as described after having been inserted endwise for engagement of the notches and projections of the mount and bolt respectively as described. To secure the seal against withdrawal, one of the side walls of the throat-way is terminated in an oblique edge, $m^4$, and the seal bolt is weakened at a correspondingly positioned oblique line, $n^4$, by an aperture, $n^5$, positioned and extending in that line, and the bolt having been inserted and engaged as described, is folded over said oblique edge of the mount at said oblique folding line of the bolt back onto the outer side of said throat-wall having the oblique edge, so that no movement of the bolt, either longitudinal or edgewise can be effected without first straightening out the seal bolt into substantially its original form, which straightening will cause it to break at the weakened line.

I claim:—

1. In a seal bolt having an end portion adapted to be engaged for locking, and having at one edge a shoulder facing away from said end, the mount for the same having means for engaging the said shoulder, adapted for such engagement by edgewise movement of the seal bolt when the latter is in locking position, the mount having a guard along which the seal bolt is inserted which terminates in an edge oblique to the path of insertion of the seal bolt, the latter being weakened for folding at an obliquely transverse line positioned to coincide with an oblique edge of the mount guard when the bolt is at locking and engaged position and adapted to break upon being straightened back into alinement with the inserted end portion.

2. A flat seal bolt having a terminal portion adapted for locking engagement, having in one edge a notch forming a shoulder for engagement against withdrawal from locking position for the seal bolt having an aperture through which its terminal is inserted for locking engagement and having a projection with which the notch of the seal bolt is engageable by edgewise movement of the latter when it is in locking position, the mount having an exteriorly-projecting guard along which the seal bolt is inserted, said guard being terminated by an edge oblique to the path of insertion of the seal bolt, the latter being weakened for folding at an obliquely transverse line which is positioned to coincide with said oblique edge of the guard when the seal mount is in locking and engaged position, and adapted to break upon being straightened back to its original form.

In testimony whereof, I have hereunto set my hand at Chicago, Illinois, this 12th day of February, 1915.

EMIL TYDEN.

Witnesses:
LUCY I. STONE,
EDNA M. MACINTOSH.

Copies of this patent may be obtained for five cents each, by addressing the "Commissioner of Patents, Washington, D. C."